3,254,478
DUST COLLECTING APPARATUS
Daniel Szego, London, England, assignor to Collectron Limited, London, England, a British company
Filed Feb. 26, 1963, Ser. No. 261,063
Claims priority, application Great Britain, Feb. 28, 1962, 7,843/62; Feb. 13, 1963, 5,871/63
1 Claim. (Cl. 55—340)

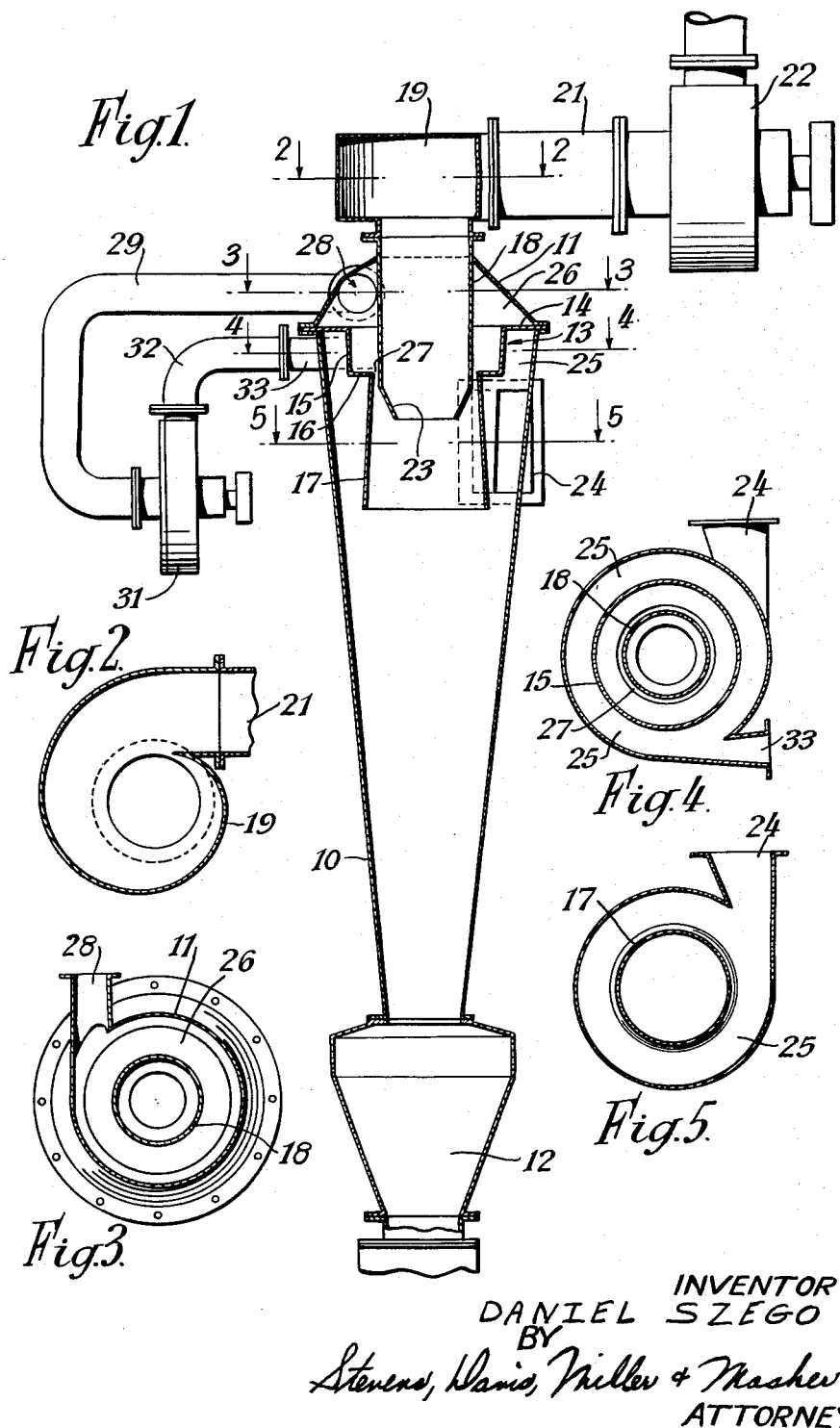

This invention relates to dust collecting apparatus of the cyclone type, and has for its object to provide apparatus of this type in which a very high proportion of dust or other solid matter is collected from aid or gas gassed through the said apparatus.

According to the present invention, dust collecting apparatus comprises a casing of circular cross-section disposed with its axis substantially vertical, a tangential inlet for dust-laden gas leading into the casing, a clean gas outlet at the top of the casing, a dust-collecting chamber at the bottom of the casing, an open-ended sleeve of circular cross-section defining with the wall of the casing a first annular space closed at its upper end and extending downwardly beyond the tangential inlet, a tube extending downwardly from the clean gas inlet into the sleeve and forming the inner wall of a second annular space, and means for extracting gas from said second annular space and returning it to said first annular space, the sleeve and tube providing between them a gap through which a peripheral layer of gas travelling upwardly through the sleeve is directed into the second annular space and being so constructed and arranged that the said gap decreases in cross-sectional area in an upward direction so that the flow of gas through it is accelerated.

The upper end of the gap is preferably defined by the junction of a part of the sleeve and an annular surface extending outwardly from the upper end of said sleeve part, the lower end of the tube being formed with a downwardly-convergent frusto-conical portion lying at least partially within the said part of the sleeve.

The downwardly-convergent frusto-conical portion of the tube is preferably so dimensioned in relation to the said part of the sleeve that the velocity of gas flowing through the gap is between one-and-a-half times and twice the velocity of gas flowing into the tube.

The dimensions of the tube and sleeve may be so chosen in relation to the capacity of a fan or blower creating the air flow through the apparatus as to maintain a gas velocity through the gap of 7,000 to 10,000 feet per minute.

Figure 6:
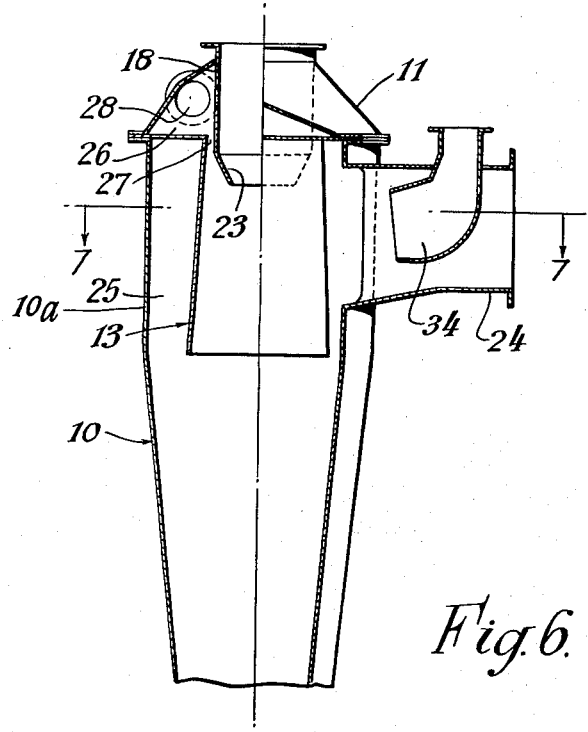
Figure 7:
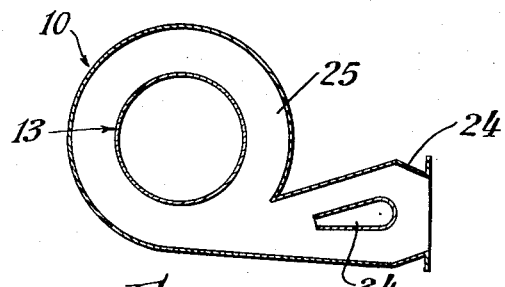

The invention is hereinafter described with reference to the accompanying drawings, in which:

FIGURE 1 is a sectional elevation of one form of dust collecting apparatus according to the invention;
FIGURE 2 is a section on the line 2—2 of FIGURE 1;
FIGURE 3 is a section on the line 3—3 of FIGURE 1;
FIGURE 4 is a section on the line 4—4 of FIGURE 1;
FIGURE 5 is a section on the line 5—5 of FIGURE 1;
FIGURE 6 is a partial sectional elevation of a modified form of dust collecting apparatus; and
FIGURE 7 is a section on the line 7—7 of FIGURE 6.

Referring to FIGURES 1 to 5 of the drawings, the apparatus comprises a casing consisting of a main downwardly-convergent tapering part 10 and an upwardly-convergent frusto-conical cap 11 closing the upper end of the part 10. The main casing part 10 may, if desired, be cylindrical or even downwardly divergent at its upper end, only its lower end being downwardly convergent. The lower end of the casing part 10 opens into a hopper 12 constituting a dust-receiving chamber. A sleeve 13 has an external flange 14 at its upper end extending outwardly between flanges on the part 10 and cap 11 at their junction, the sleeve 13 including a cylindrical part 15 extending downwardly from the flange 14, a flat annular inward step 16 at the bottom of the cylindrical part 15, and a slightly downwardly divergent lower part 17 which is of smaller diameter than the part 15 at least at its upper end. A tube 18 extends downwardly through the cap 11 into the sleeve 13, and is connected by way of a tangential outlet fitting 19 and a duct 21 to a suction fan 22. The tube 18 is, for most of its length, cylindrical, and has a diameter slightly less than that of the upper end of the part 17 of the sleeve, but at its lower end is a downwardly convergent frusto-conical part 23, the upper end of which is below the step 16 in the sleeve.

A tangential inlet 24 leads into the annualr space 25 defined by the upper end of the casing part 10 and the sleeve 13, the said sleeve 13 extending downwardly below the said inlet 24. The tubs 18 constitutes a clean gas outlet and the lower end of the casing part 10 a dust outlet.

The annular space 25 is closed at its top by the flange 14 which, with the cylindrical part 15 of the sleeve, separates that space 25 from a second annular space 26 between the cap 11 and the tub 18, the annular space 26 being connected with the casing part 10 through the lower part 17 of the sleeve 13 and the annular gap 27 between the part 17 of the sleeve and the tube 18.

A tangential outlet 28 leads from the annular space 26 to a duct 29 which extends to the inlet of an auxiliary centrifugal fan 31, the outlet of the fan 31 being connected by another duct 32 to a tangential inlet 33 leading into the annular space 25 above the main tangential inlet 24.

It will be apparent that the proportion of the total gas flow which is recirculated will depend on the relative areas of the orifice defined by the lower end of the part 23 of the tube 18 and of the annular clearance between the said lower end and the part 17 of the sleeve and that, having determined the rate of delivery of the fan 22, the area of the orifice at the lower end of the tube 18 to provide a required velocity therethorugh can be readily calculated. The upward convergence of the gap 27 causes gas flowing therethrough to be accelerated, and the angle of taper of the part 23 of the tube can be calculated to provide any desired degree of acceleration.

It has been found that, for satisfactory results, the velocity of gas flow through the gap 27 at its narrowest part must be between 7,000 and 10,000 feet per minute and that this velocity should be between one-and-a-half times and twice the velocity of gas flow through the orifice at the lower end of the tube 18.

The auxiliary fan 31 has a capacity such that it handles about one fifth to one quarter of the volume of air passing through the fan 22, this being sufficient to maintain an absolute pressure in the annular space 26 which is less than the absolute pressure produced at the axis of the apparatus by the spiral rotation of the gas. The area of the inlet 33 is so chosen in relation to the capacity of the fan 31 as to ensure that the velocity of gas entering the annular space 25 through the inlet 33 is greater than the velocity of gas entering the said space through the inlet 24.

When the apparatus is in operation, dust-laden gas enters the annular space 25 through the inlet 24 and travels downwardly in a spiral path, afterwards returning upwardly still in a spiral path to enter the sleeve 13. Dust carried by the gas tends to be thrown outwardly by centrifugal force, and a large proportion of the dust, particularly the larger or heavier particles, separates from the gas stream when the latter reverses its vertical direction of flow, and falls into the hopper 12. The remaining dust, still tending to be thrown outwardly by centrifugal force as the gas flows upwardly, is largely concentrated in the outer layers of the upwardly spiralling gas stream. The said outer layer is separated from the main gas stream flowing to the clean gas outlet by the bottom edge of the part 23 of the tube 18, and is accelerated as it flows through the gap 27 due to the convergence of the gap, thus facilitating the retention therein of dust, which is carried through the gap into the space 26. The gas entering the space 26 is drawn by the fan 31 through the duct 29 and is delivered into the space 25 through the inlet 24 for recirculation.

Whilst it is preferred to induce the main flow of gas through the apparatus by a suction fan such as the fan 22, the flow may be induced by a pressure fan coupled to the inlet 24. The tube 18 may have its downwardly-convergent portion 23 extending upwardly above the step 16 if desired, thus enabling the gap 27 to be adjusted in area by moving the tube up and down.

The recirculated gas may be introduced into the main stream of dust-laden gas in the inlet 24 instead of being separately introduced into the annular space 25. As shown in FIGURES 6 and 7, a nozzle 34 may be mounted in the inlet 24 with its mouth directed towards the space 26. As the gas flowing in the nozzle 34 has a higher velocity than the gas flowing in the inlet 24, the gas flowing in the nozzle 34 has an injector effect assisting the flow of gas in the inlet. FIGURE 6 shows a casing part 10 having a cylindrical upper section 10a, and the step in the sleeve 13 is omitted, the tube 18 co-operating with the upper end of the said sleeve to define the gap 27.

I claim:

Dust collecting apparatus comprising a casing of circular cross-section disposed with its axis substantially vertical, a tangential inlet for dust-laden gas leading into the casing, a clean gas outlet at the top of the casing, a dust-collecting chamber at the bottom of the casing, an open-ended sleeve of circular cross-section defining with the wall of the casing a first annular space closed at its upper end and extending downwardly beyond the tangential inlet, a tube extending downwardly from the clean gas inlet into the sleeve and forming the inner wall of a second annular space, a conduit extending between and in communication with said first and second annular spaces, and an auxiliary fan operatively connected in said conduit and adapted to extract gas from said second annular space and return it to the first annular space at a velocity greater than that of fresh dust-laden gas entering said space, the sleeve and tube providing between them a gap through which a peripheral layer of gas traveling upwardly through the sleeve is directed into the second annular space, that part of the sleeve defining said gap including a slightly downwardly divergent lower part, and that part of the tube defining said gap including a downwardly convergent frusto-conical part, the convergence of said tube part being of greater magnitude than the divergence of said sleeve part, whereby the flow of gas is gradually accelerated as it flows in an upward direction through said gap, said flow being of greater magnitude than the flow into said tube.

References Cited by the Examiner

UNITED STATES PATENTS

| | | | |
|---|---|---|---|
| 1,165,401 | 12/1915 | Fender | 55—340 |
| 1,412,334 | 4/1922 | Bernstein | 55—340 |
| 1,753,502 | 4/1930 | Clark | 55—340 |
| 1,776,323 | 9/1930 | Phelps | 55—340 |
| 2,039,115 | 4/1936 | Reif | 55—340 |

FOREIGN PATENTS

| | | |
|---|---|---|
| 886,921 | 1/1962 | Great Britain. |

HARRY B. THORNTON, *Primary Examiner.*